United States Patent [19]

Larner

[11] 3,977,436

[45] Aug. 31, 1976

[54] BI-STABLE VALVE APPARATUS

[75] Inventor: Donald Alexander Larner, Kingston-upon-Thames, England

[73] Assignee: Fluid Devices Limited, Kingston-upon-Thames, England

[22] Filed: Feb. 24, 1975

[21] Appl. No.: 552,724

Related U.S. Application Data

[62] Division of Ser. No. 412,012, Nov. 1, 1973, Pat. No. 3,889,219.

[30] Foreign Application Priority Data

Nov. 2, 1972 United Kingdom .............. 50624/72

[52] U.S. Cl. .............................. 137/625.65; 251/65; 251/129

[51] Int. Cl.[2] .......................................... F16K 31/08

[58] Field of Search .............................. 251/65, 129; 137/625.65

[56] References Cited

UNITED STATES PATENTS

| | | | |
|---|---|---|---|
| 3,203,447 | 8/1965 | Bremner et al. | 137/625.65 X |
| 3,379,214 | 4/1968 | Weinberg | 251/65 X |
| 3,550,632 | 12/1970 | Hoakes | 137/625.65 |
| 3,814,376 | 6/1974 | Reinicke | 251/65 |

*Primary Examiner*—Arnold Rosenthal
*Attorney, Agent, or Firm*—Marn & Jangarathis

[57] ABSTRACT

A bistable, electromagnetically-actuated valve has a closed chamber containing a moving armature with a valve orifice in each end of the closed chamber, one of which is formed by the end of a tube, a space around the tube forming the third fluid connection to the closed chamber. The armature has valve seats for closing the valve orifices.

2 Claims, 6 Drawing Figures

FIG. 1
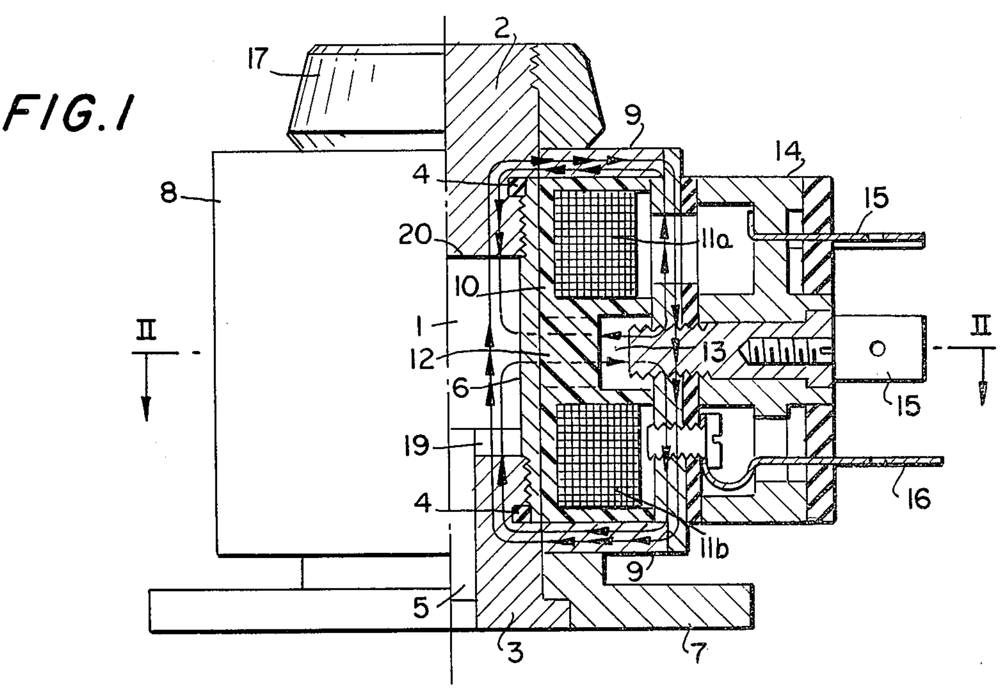
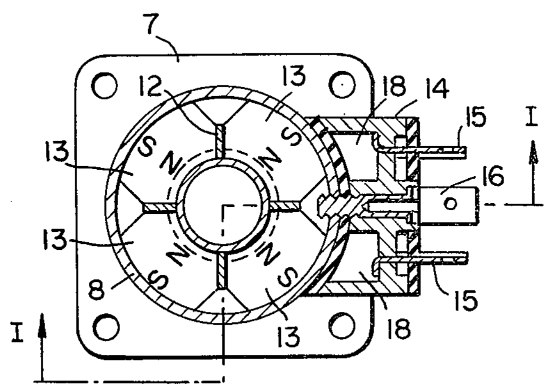
FIG. 2
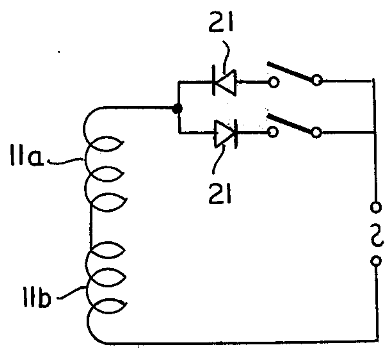
FIG. 3
11a
+
−
11b
+
FIG. 4

FIG. 5
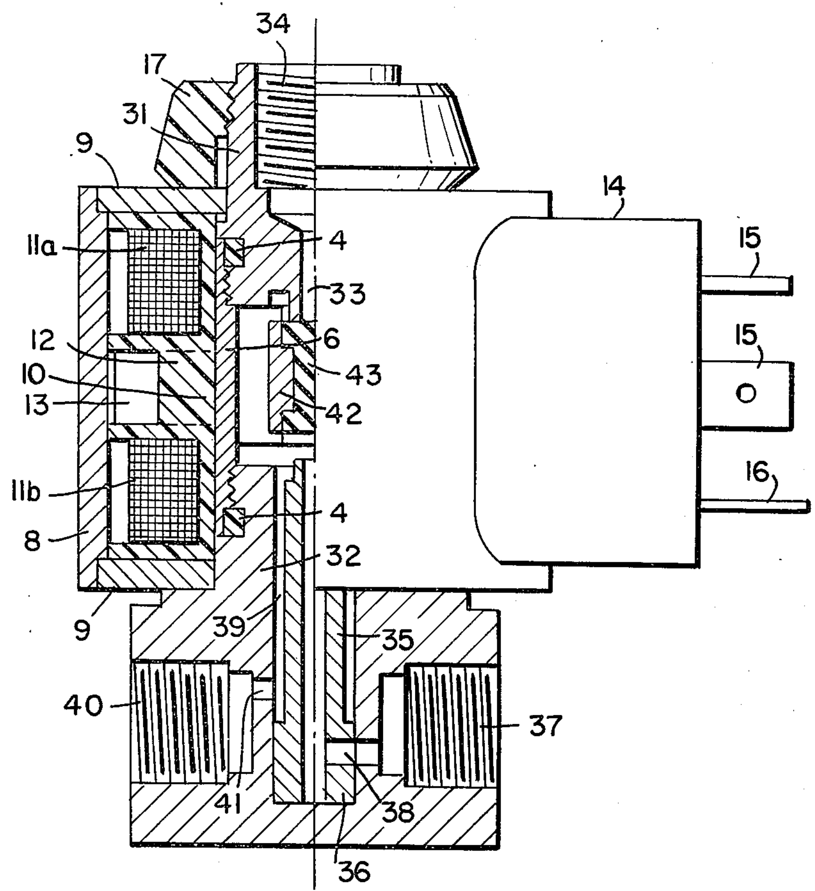
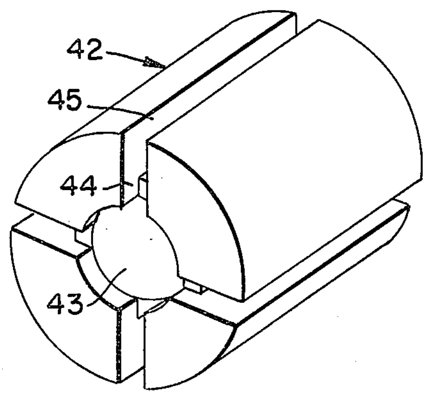
FIG. 6

BI-STABLE VALVE APPARATUS

This is a division, of application Ser. No. 412,012, filed 11/1/73 now U.S. Pat. No. 3,889,219.

BACKGROUND OF THE INVENTION

The present invention relates to an electromagnetic actuator comprising a moving armature, at least one winding for electrical energisation and moving the armature, and an annular permanent magnet for providing magnetic latching, the permanent magnet being magnetised so as to have one pole face radially inwards of the other pole face. The annular magnet will normally extend over the path of movement of the centre of the armature, the armature being movable between two end positions. The latching effect is particularly useful with pulse-operated type actuators, and causes the armature to be positively retained in the end position it has reached until such time as the energisation of the winding(s) is reversed; this enables the actuator to be actuated by a short current pulse without requiring continuous energisation to retain the armature in its proper position.

FIG. 1 of British Patent Specification No. 1,089,596 discloses such an electromagnetic actuator.

A high coercivity magnet should be used for the annular magnet as the annular magnet must resist the coercive effect of the actuator windings, and this magnet can for instance be made of ceramic material. The magnet is difficult to fabricate and difficult to magnetise. A central pole-piece (usually in the form of a mandrel) must be used to obtain the radial magnetising field required, and the field strength of the magnetising field must be very high. As this pole-piece must be of reasonable size to obtain a strong enough magnetising field, the annular magnet could be made with an oversize bore, an annular iron packing piece being inserted into the bore to provide a central bore of suitably small size for the actuator. However, accurate machining is required to avoid an air gap between the annular magnet and the iron packing piece; in addition, in order to obtain sufficient volume of permanently magnetised material, the annular magnet must be relatively long or of large diameter.

The permanent magnet could be used for a purpose other than that of providing latching, for instance as described in relation to FIG. 1 of German Patent Specification No. 2,013,051.

It is desirable to provide an annular permanent magnet which is easy to fabricate and to magnetic without using an excessive amount of magnetised material.

According to the present invention, the annular permanent magnet is a composite magnet formed of at least two individual magnets which are magnetised so as to have one pole face radially inwards of the other pole face.

Although the individual magnets can be for instance bar magnets arranged radially around the axis of movement of the armature, the individual magnets are preferably substantially in the shape of sectors.

The magnetised sectors can be cheap to make and magnetise. Each individual sector can be formed for instance by a sintering process, and the effective radial thickness of the composite magnet can be easily determined by grinding or otherwise machining the inner arcuate surface of each sector in a jig which locates on the outside diameter (or outer arcuate surface) of the sector; the grinding can be performed using a formed peripheral grinding wheel with the sectors clamped in line. It is possible also to grind or otherwise machine the outside surfaces of the sectors if so desired, either as an alternative to machining the inside surfaces, or in addition to such machining; machining the inside, however, can result in the removal of less material for the same effect.

As no iron packing piece is required, the necessary magnetised volume can be obtained while keeping the composite magnet relatively short; for instance, its length (axial thickness) can be one-eighth to one-half of its internal diameter, preferably about ½ of its internal diameter. Its external diameter can be from 1½ times to 4 times its internal diameter, and is preferably about double its internal diameter.

During magnetisation, the pole-piece adjacent the radially inner surface can be as large as is desired, within normal practical limits. The magnetisation of each individual permanent magnet can be parallel to the mean radius of the individual magnet, but it is possible to obtain more nearly radial magnetisation; near radial magnetisation is more desirable the smaller the number of individaul magnets, but in general terms, the field of the composite magnet does not have to be strictly uniform as long as it is generally radial.

There may be only two individual permanent magnets, which may be each approximately half annular, but there are preferably three or more individual permanent magnets, four individual magnets being found to be a useful number which can give the advantages of the invention without requiring too many parts to fabricate, magnetise and assemble; nonetheless, more than four permanent magnets may be used.

The individual magnets (preferably sectors) forming the composite magnet need not be in contact with each other and can be separated by radial webs which hold the magnets in position. In a convenient arrangement, the winding is or windings are wound on a bobbin which also mounts the magnets. The bobbin can thus have two portions on which two respective windings are wound, the portions being spaced apart axially and interconnected by radially-extending webs; the magnets are positioned between the bobbin portions and retained by the webs. An outer sleeve can surround the bobbin and hold the magnets in position. The bobbin can be arranged such that it can be removed from the actuator by releasing a simple, releasable fixing means, such as a coaxial nut, for easy removal of the bobbin, winding(s) and magnets.

Preferably, the winding(s) and the armature are coaxial with the path of movement of the armature and the individual permanent magnets are symmetrically arranged about the axis of the winding(s) and armature. This enables all the main parts (with the exception of the individual magnets and the separating webs) to be coaxial solids of rotation and enables the actuator to be cheap to manufacture.

The armature preferably moves in a space which is limited at each end by stationary ferromagnetic pole-pieces and whose sides are limited by a non-ferromagnetic tube interconnecting the pole-pieces, the composite annular magnet and the winding(s) being stationary and outside the tube, a ferromagnetic tube (acting as a magnetic yoke) surrounding the winding(s) and the composite annular magnet, and the ends of the ferromagnetic tube being closed by ferromagnetic end pieces. This is a useful constructional arrangement. In addition, by having the permanent magnets stationary, i.e. fixed, they are not subject to mechanical shock during the operation and there is thus considerably less tendency to demagnetise, or, if they are sintered, to break up.

The armature is preferably movable between two end positions, in each of which it abuts a third magnetic pole-piece and forms part of a substantially closed magnetic circuit. By having the magnetic circuit substantially closed, there is very little reluctance and a greater latching force. This reduces the susceptibility of the actuator to shocks of the kind causing it to change over when de-energised.

There are preferably two axially-spaced, coaxial windings with the composite annular magnet coaxially therebetween, the windings being dimensioned and electrically interconnected so that both are energised for change-over of the actuator and so that the induced fluxes in the composite annular magnet substantially cancel each other out, and this is most simply arranged by having the windings equi-spaced from the composite annular magnet and of the same size, and passing the same current through each winding. In this way, there can be little or no induced flux through the individual permanent magnets, and thus there is less tendency to de-energise the individual permanent magnets.

The actuator can in particular be used for actuating a valve such as a pilot valve, and the valve may be a valve as described and claimed in U.S.A. Pat. application Ser. No. 225569 filed 1st Feb. 1972.

The armature can if desired be a movable valve member, for instance carrying rubber seats, forming an electromagnetically-actuated valve.

The invention relates to a bistable, electromagnetically-actuated valve comprising three pressure fluid connections and two valve orifices connected to two respective pressure fluid connections, the armature being movable between two end positions such that a first said pressure fluid connection is connected to the third said pressure fluid connection when the armature is at one end position, and the second said pressure fluid connection is connected to the third pressure fluid connection when the armature is at the other end position. This bistable, electromagnetically-actuated valve provides a very simple bistable valve, particularly for pilot valve use, and although it is preferred that the annular permanent magnet is a composite annular permanent magnet, this need not necessarily be so.

BRIEF DESCRIPTION OF THE INVENTION

In a preferred embodiment, the bistable valve has an enclosed space in which the armature moves, the third connection being permanently connected to the enclosed space, the first and second valve orifices being at opposite ends of the enclosed space and the armature carrying e.g. rubber valve seats for closing the respective valve orifices. One of the end faces of the enclosed space may have a hole therein, a tube being mounted in the hole and spaced from at least one side thereof to leave a gap outside the tube, and the third pressure fluid connection being connected to the gap, the opening in the end of the tube providing a said valve orifice; the hole and tube are preferably coaxial with the enclosed space, the gap being an annular gap. This provides a simple solution for connecting the third pressure fluid connection to the enclosed space while providing a relatively large flow passage which does not occupy too much of the end face or pole-piece area. An alternative arrangement is to have a central bore in the end face to provide a said valve orifice and a parallel bore in the end face to connect the enclosed space with the third connection, the latter bore preferably leading into an annular groove in the end face.

However, in another embodiment, the armature may be connected by a mechanical linkage such as a push rod to a double-acting valve member.

In order to ensure good communication between the first or second pressure fluid connections and the third pressure fluid connection by way of the respective valve orifice, the armature preferably has at least one radial slot in at least one of its end faces and at least one longitudinal slot down its peripheral surface, the longitudinal slot(s) intersecting the (respective) radial slot(s).

The invention will be further described, by way of example, with reference to the accompanying drawings, which show two actuators, and of which:

FIG. 1 is an elevation of a first actuator, partly in axial section along the line I—I of FIG. 2;

FIG. 2 is a horizontal section along the line II—II of FIG. 1, but on a smaller scale;

FIG. 3 is a circuit diagram showing, schematically, one method of operation of the actuator;

FIG. 4 is a circuit diagram showing, schematically, another method of operation of the actuator;

FIG. 5 is an elevation of a second actuator, partly in axial section; and

FIG. 6 is an isometric projection, on a larger scale, of the armature of the second actuator.

DETAILED DESCRIPTION OF FIRST ACTUATOR

In the first actuator (FIGS. 1 and 2) which is in accordance with co-pending U.S. Pat. application Ser. No. 412,012 dated Nov. 1, 1973 now U.S. Pat. No. 3,889,219, a freely slidable armature 1 is enclosed in a tube 6 of dia-magnetic material, the latter being attached to stationary pole-pieces 2 and 3 and sealed thereto by 'O' seals 4 so that the actuator can be of the "wet armature" type, i.e. in fluid communication with a valve being controlled by the actuator. The movement of the armature 1 is communicated to an associated valve or other mechanism by a thrust pin 5, also of dia-magnetic material. A baseplate 7 adapts the assembly for attachment to the carcase of the associated control valve or other mechanism. The associated valve may be a valve as described with reference to the drawings of U.S.A. Pat. application Ser. No. 225569.

Surrounding the tube and pole-piece assembly is a steel enclosure formed of an outer sleeve or tubular part 8 and two end pieces 9. Contained therein is a coil bobbin 10 which carries two stationary electrical windings 11*a* and 11*b* contained in separate parts of the bobbin which are nevertheless united as a matter of constructional convenience by four webs or ribs 12. Sandwiched between the two parts of the bobbin and separated and held by the webs 12 are four stationary sector-shaped, ceramic, individual permanent magnets 13 which are magnetised along the N-S axes indicated in FIG. 2, thus generating a total magnetic field in a plane radial to the axis of the assembly. The magnets 13 are fabricated and magnetised as described above.

An electrical connector 14 carries terminal pins 15 and an earth pin 16, for the purpose of connecting the electrical windings to an external control circuit and providing for electrical safety even when the coil assembly is removed by hand.

The coil assembly is easily removable for exchange or maintenance by unscrewing a retaining nut 17, and is also rotatable to any alternative position around the axis to achieve the most convenient position for the electrical connector 14.

Insulated cavities 18 formed in the connector 14 provide accommodation for electrical rectifiers, which are desirable as integral features where the actuator is to be employed in conjunction with an alternating electrical supply.

Referring to FIG. 1, if there is no electrical excitation and the armature is in the upper position shown, the permanent flux produced by the permanent magnets 15 circulates around the two main paths shown with double and single arrows; the air gap 20 being closed, the reluctance of the path with double arrows in FIG. 3 is relatively low, and this is therefore the preferred path and most of the flux passes this way. The flux following the path with single arrows is relatively weak because of the presence of an air gap 19. The armature 1 is therefore firmly held against the upper pole-piece 2 by the resultant nett attraction thereto.

FIG. 1 also shows a flux which follows a path with triple headed arrows, right around the actuator; this flux is induced when the windings 11*a* and 11*b* are suitably energised with direct current. This opposes the double-arrowed holding flux, and complements the single-arrowed flux, thus eventually impelling the armature 1 downwards to the opposite pole-piece 3. It is believed that two equal and opposite fluxes are induced in the permanent magnets 13, giving no nett induced flux. This not only avoids any tendency to demagnetise the permanent magnets 13, but also avoids consumption of extra power - extra power would be needed to induce in the permanent magnets 13 a flux opposing their own flux. When the excitation is removed, the armature 1 remains in the lower position because the lower flux is now much stronger than that passing via the upper pole-piece 2.

Reversal of the armature 1 is later accomplished by exciting the windings 11*a* and 11*b* with reverse polarity, thus inducing a flux of opposite sense to the triple-arrowed flux.

It has been found that the actuator described above requires a very low wattage. In an actuator whose height (bottom of baseplate 7 to top of retaining nut 17) was 45 mm, the power level to switch was 1 watt while the attaching force (force holding the armature 1 to the respective stationary pole-piece 2 or 3) was 800 grammes.

The previous description of the method of operation of the actuator supposes that the two windings are connected electrically so that they are excited simultaneously, and produce magnetomotive forces which are complementary along the axis of the actuator. Such a simple arrangement is not inconvenient for use with alternating current; a suitable arrangement of rectifiers 21 used in this case facilitates reversal of the current, as shown in FIG. 3. The rectifiers 21 can be positioned in the cavities 18.

In order to effect reversal on direct current, however, a double pole changeover switch or an equivalent array of switching means must be used, which is not very convenient for normal industrial control purposes. Practical experiment has shown that the device will work quite satisfactorily if the two windings 11*a* and 11*b* are energised separately, using one only for each sense of movement, and using it to generate an additional flux across the open air gap only. Such an arrangement is shown in FIG. 4. With this simpler arrangement, the power consumed is rather high by comparison with that first described; however, if this higher loss is tolerable, the greater simplicity of construction and operation are desirable.

DETAILED DESCRIPTION OF SECOND ACTUATOR

In the second actuator (FIGS. 5 and 6), the tube and pole-piece assembly 8, 9, the bobbin 10, the windings 11*a* and 11*b*, the permanent magnets 13, the electrical connector 14 and the retaining nut 17, as well as the tube 6 and 'O' seals 4, are exactly as described with reference to FIGS. 1 and 2.

However, the actuator is formed as a bistable pilot valve, and the enclosed space within the tube 6 has respective pole-pieces 31 and 32, which are formed with respective valve orifices. The pole-piece 31 has a valve orifice 33 formed by a bore in a central projection in the pole-piece 31, the bore communicating with a first fluid pressure connection 34. The pole-piece 32 has an axial bore containing a coaxial tube 35. The tube is preferably formed of a ferromagnetic material, but need not be. The lower end portion 36 of the tube 35 is of larger diameter than the remainder, and makes an interference fit in the hole in the pole-piece 32, the tube 35 being held in position by any suitable adhesive. The top end of the tube forms a valve orifice, and this valve orifice is connected to a second pressure fluid connection 37 by way of the interior of the tube 35 and a transverse bore 38. Around the tube 35, between the tube 35 and the internal wall of the bore in the pole-piece 32, there is an annular duct 39 which communicates with a third pressure fluid connection 40 by way of a transverse bore 41.

The armature 42 has a stepped, central bore containing moulded-in rubber 43 providing a valve seat at each end of the armature 42. As shown in FIG. 6, the armature 42 has any suitable number of radial slots 44 in its end faces and longitudinal slots 45 along its peripheral surface, the longitudinal slots intersecting respective radial slots. In this way, good communication is provided between the annular duct 39 and the enclosed space in which the armature 42 moves, which is particularly important when the armature 42 is in its lower end position.

I claim:

1. A bistable, electromagnetically-actuated valve comprising:

a moving armature, movable between two end positions;

at least one winding for electrical energization and moving said armature;

an annular permanent magnet for providing magnetic latching;

means defining an enclosed space containing said armature, said defining means comprising tubular means and respective end wall means closing the ends of said tubular means;

a first valve orifice defined in a first said end wall means;

a bore defined in a second said end wall means;

a tube mounted in said bore and extending at least to adjacent said space, the end of said tube at least adjacent said space defining a second valve orifice, and said tube being spaced from the internal wall of said bore;

a first pressure fluid connection connected to said first valve orifice;

a second pressure fluid connection connected to said second valve orifice;

a third pressure fluid connection connected to said space around said tube and thereby to said enclosed space; and means providing communication between said third pressure fluid connection and said first valve orifice when said armature is in said second end position; and valve seats on each end of said armature, whereby when said armature is at a first said end position, said first valve orifice is closed and said second pressure fluid connection is connected to said third pressure fluid connection, and when the armature is at a second said end position, said second valve orifice is closed and said first pressure fluid connection is connected to said third pressure fluid connection.

2. A bistable valve as claimed in claim 1 wherein said communication providing means comprises at least one radial slot defined in at least one of the end faces of said armature and at least one longitudinal slot along the peripheral surface of said armature, said longitudinal slot intersecting said radial slot, thereby providing communication between said third pressure fluid connection and said first valve orifice when said armature is in said second end position.

* * * * *